(12) United States Patent
Lim

(10) Patent No.: US 6,784,921 B2
(45) Date of Patent: Aug. 31, 2004

(54) FILM MODE DETECTION METHOD USING PERIODIC PATTERN OF VIDEO SEQUENCE

(75) Inventor: Il Taek Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 09/726,572

(22) Filed: Dec. 1, 2000

(65) Prior Publication Data

US 2001/0002853 A1 Jun. 7, 2001

(30) Foreign Application Priority Data

Dec. 29, 1909  (KR) ................................... 1999-0054579

(51) Int. Cl.⁷ ................................................ H04N 7/18
(52) U.S. Cl. ........................ 348/97; 348/459; 348/558
(58) Field of Search ............................. 348/97, 457, 98, 348/441, 449, 558, 700, 701, 526, 607

(56) References Cited

U.S. PATENT DOCUMENTS

| | | | | |
|---|---|---|---|---|
| 5,317,398 A | * | 5/1994 | Casavant et al. ............ 348/570 |
| 5,406,333 A | * | 4/1995 | Martin ........................ 348/449 |
| 5,452,011 A | * | 9/1995 | Martin et al. ............... 348/449 |
| 5,488,422 A | * | 1/1996 | Faroudja et al. ............ 348/448 |
| 5,563,651 A | * | 10/1996 | Christopher et al. .......... 348/97 |
| 5,606,373 A | * | 2/1997 | Dopp et al. ................. 348/459 |
| 5,689,301 A | * | 11/1997 | Christopher et al. .......... 348/97 |
| 5,734,420 A | * | 3/1998 | Lee et al. .................... 348/97 |
| 6,014,182 A | * | 1/2000 | Swartz ....................... 348/700 |
| 6,151,075 A | * | 11/2000 | Shin et al. .................. 348/459 |
| 6,201,577 B1 | * | 3/2001 | Swartz ....................... 348/558 |
| 6,298,090 B1 | * | 10/2001 | Challapali et al. ..... 375/240.29 |

* cited by examiner

Primary Examiner—Michael H. Lee
Assistant Examiner—Paulos M. Natnael
(74) Attorney, Agent, or Firm—Fleshner & Kim, LLP

(57) ABSTRACT

A film mode detection method using a periodic pattern of a video sequence comprises the steps of: computing every absolute value of differences between every pair of corresponding pixels in two fields which are arranged within a predetermined distance on a time line; comparing a sum of the absolute value of differences between every corresponding pixels in two fields with the first predetermined threshold value M1 and limiting the sum to the first threshold value if the sum is greater than the first threshold value; filtering the video sequence and calculating a power of the filtered sum; and comparing the calculated power with the second predetermined threshold value M2 so as to determine the signal as a film mode if the power of the sum is greater than the second threshold value.

11 Claims, 2 Drawing Sheets

FILM MODE DETECTION METHOD USING PERIODIC PATTERN OF VIDEO SEQUENCE

BACKGROUND OF THE INVENTION (a) Field of the Invention

The present invention relates to a film mode detection method, and in particular, to a method for detecting whether a transferred video sequence is a 3:2 pull-down video sequence (film mode) or not, using a periodic pattern of the video sequence.

(b) Description of the Related Art

Generally, a movie film comprises 24 frames per second (FPS). Accordingly, in order to display the film by a TV system, the 24 FPS of motion picture signals must be converted to an appropriate frame rate matched for the TV system. For example, to display a film in an NTSC TV system, the 24 FPS of film signals are converted into 30 FPS of NTSC signals. A device called Telecine is used for this purpose of converting a sequence of a frame rate to a sequence of another frame rate.

In converting the 24 FPS of film signals into 30 FPS of NTSC signals, the Telecine uses a 3:2 pull-down process, which is called in a film mode because it is applied to the movie film. The 3:2 pull-down process converts the film signal to NTSC signals in such a way of converting two frames of 24 Hz into 5 fields of 60 Hz. In other words, three fields are made by repeating one frame out of the first 24 Hz frame, and two fields are made out of the second 24 Hz frame, accordingly 5 fields of the 60 Hz are made out of the 2 frames of 24 Hz.

Also, the digital video disc (DVD) emerged in place of the VCR tape adopts the 30 Hz frame frequency for signal processing of NTSC system and for maintaining a compatibility with it. Thus, the 3:2 pull-down process is usually used in a video system using digital storage and reproduction media such as the DVD.

In the case of ATSC system, since there exists a video format having 24 Hz frame frequency, the 24 FPS film can be coded in 24P format (24 Hz frame frequency, progressive scanning). However, in a position of a broadcasting station using 60I format (30 Hz frame frequency, 2:1 interlaced scanning) for normal television broadcasting, it can be a burden to accommodate the two kinds of formats of 24P and 60I.

In view of the above situation, the film signal adopting 3:2 pull-down process to support the 60I format using 30 Hz frame frequency will be remained as a dominant source of video sequence even in a time when the DVD and digital broadcasting are universalized.

Accordingly, it is very important to detect the 3:2 pull-down film mode from signals to be decoded.

SUMMARY OF THE INVENTION

It is an object of the present invention to provide an effective method for detecting a film mode which is capable of simply determining whether input signals are 3:2 pull-down signals.

To achieve the above object, the film mode detection method according to the present invention uses a periodic pattern of a video sequence. The method according to the present invention comprises the steps of: (a) computing every absolute value of differences between every pair of corresponding pixels in two adjacent fields which are arranged within a predetermined distance on a time line; (b) comparing a sum of the absolute value of differences between every corresponding pixels in two pixels with a first predetermined threshold value M1 and limiting the sum value to the first threshold value if the sum is greater than the first threshold value; (c) filtering the video sequence comprising the sum of the absolute value of differences between every pair of pixels in two fields and calculating a power of the filtered sum value; and (d) comparing the calculated power to a second threshold value M2 so as to determine the signal as a film mode if the power of the sum value is greater than the second threshold value.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will be described hereinafter with reference to the accompanying drawings.

The present invention provides a method for detecting a film mode using a periodic pattern of a video sequence. The film mode detection method of the present invention using a periodic pattern of a video sequence comprises the steps of: (a) computing every absolute value of differences between every pair of corresponding pixels in two adjacent fields which are arranged within a predetermined distance on a time line; (b) getting sum of the differences between every corresponding pixels in two adjacent fields; (c) comparing the sum of the absolute value of the differences with a predetermined threshold value; and (d) determining whether the video sequence is a film mode or not based on the result of the comparison.

The sum of the difference is limited in such a way that the sum value is prepared to the threshold value and then the sum value is replaced by the threshold value if it is greater than the threshold value.

The film mode detection is performed using the periodic pattern of the sequence comprised of the whole difference between the fields, i.e., the sum of differences between every pair of corresponding pixels in the two fields. The periodic pattern of the sequence is detected by a broadband filter in which a main frequency $2\pi/5$ and DC gain is 0.

Whether signal sequence is film mode or not is determined by comparing the filtered signal power to a predetermined value. Such that if the signal power is greater than the predetermined value, the signal sequence is determined as the film mode sequence.

Now, the film mode detection procedure according to the predetermined embodiment of the present invention will be described hereinafter with reference to FIG. 1 and FIG. 2.

Figure 1:
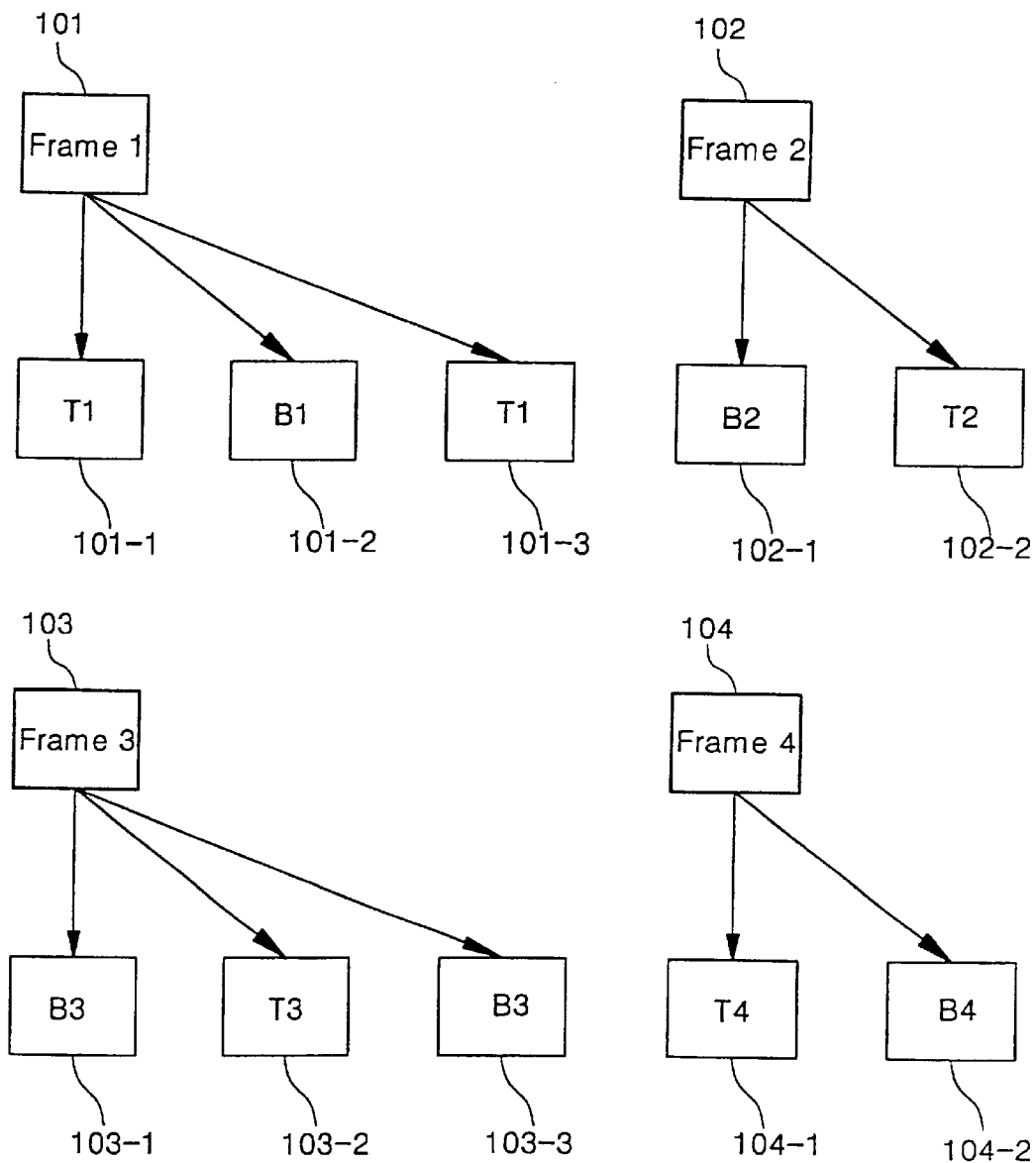
FIG. 1 is a view for explaining a pull-down process according to a preferred embodiment of the present invention.

FIG. 1 is a drawing for illustrating the 3:2 pull-down process and the pattern of the video sequence pulled down. As described above, pull-down process is a method for converting a film signal sequence into an appropriate TV signal sequence.

As shown in FIG. 1, a first film signal frame 101 is transferred to three TV signal fields 101-1, 101-2, and 101-3 and a second film signal frame 102 is transferred to two TV signal fields 102-1 and 102-2. In the same pattern, a third film signal frame 103 is transferred to three TV signal fields 103-1, 103-2, and 103-3 and a fourth film signal frame 104 is transferred to two TV signal fields 104-1 and 104-2.

That is, a frame of film signal transformed into top field made of odd lines and bottom field made of even lines for the two TV fields. And the three TV fields are made of repetition one of top field or bottom field.

The three TV signal fields 101-1, 101-2, and 101-3 transferred from the first film signal frame 101 are respectively expressed as T1, B1, and T1, and T1 and B1 mean a top field and a bottom field. The two TV signal fields 102-1 and 102-2 transferred from the second film signal frame 102 are respectively referred as a B2 and a T2, and the B2 means a bottom field and the T2 means a top field. The three TV signal fields 103-1, 103-2, and 103-3 transferred from the third film signal frame 103 are respectively expressed as B3, T3, and B3, and B3 and T3 mean a bottom field and a top field. The two TV signal fields 104-1 and 104-2 transferred from the second film signal frame 104 are respectively referred as a T4 and a B4, and the T4 means a top field and the B4 means a bottom field.

Accordingly, a picture sequence is periodically repeated in a 10 field-pattern of T1, B1, T1, B2, T2, B3, T3, B3, T4, and B4. Supposed that the 10 fields obtained from the 3:2 pull-down process are referred to F1, F2, F3, F4, F5, F6, F7, F8, F9, and F10 in order, differences between a pair fields which are located within a predetermined distance (1/30 sec) on the time line among the 10 fields can be computed as following.

For example, a sum of differences between every pair corresponding pixels of the field F1 and the field F3, a sum of differences between every pair corresponding pixels of the field F2 and the field F4, a sum of differences between every pair corresponding pixels of the field F3 and the field F5, a sum of differences between every pair corresponding pixels of the field F4 and the field F6, and a sum of differences between every pair corresponding pixels of the field F6 and the field F8 can be respectively calculated.

Among the sums in absolute value, the absolute value of F1–F3, in which case the difference between the repeated fields T1s is obtained, and the absolute value of F6–F8, in which case the difference between the repeated fields B3s is obtained, are very small. The absolute value of the difference between fields is very small because the absolute value is obtained by subtracting original field from repeated field. If there is no noise in those repetitive fields, the absolute value of the difference between the repeated fields converged into 0. This periodic pattern of the fields can be used for detecting the film mode.

That is, the film mode detection is perform in orders of calculating difference between two fields that are arranged within the 1/30 second on the time line by summing every pair of corresponding pixels in that two fields, this calculation being performed in every pair of fields arranged within the 1/30 second on the time line, obtaining the absolute of the differences between the corresponding fields, creating an intermediate data Di on the basis of the differences between the corresponding fields and their absolute values, verifying the periodic pattern of 3:2 pull-down signals using the data.

The absolute values can be summarized as |F1–F3|=D1, |F2–F4|=D2, |F3–F5|=D3 . . . |Fn–Fn+2|=Di such that D1 and D6 have very small values and the rest values are very large, if the signals are pulled down through the 3:2 pull-down process. The value Di shows the periodic pattern where the small value occurs every fifth field in order of D1 (small value), D2 (large value), D3 (large value), D4 (larger value), D5 (larger value), D6 (small value), D7 (larger value), . . . , such that this periodic pattern can be used for the film mode detection.

Although there is the periodic pattern, it is difficult to determine how small the values of D1 and D6 are if the signals include much noise. And even though there is no noise in the signals, it is difficult to determine how large the value of the rest fields such as D2~D5 are. Accordingly, it is difficult to determine if the values of Di are large or small by adapting one threshold value. In consideration of this problem, the present invention adopts a threshold value M1 for preventing the Di from being larger and the Di values larger than the threshold value M1 is replaced by the threshold value M1 in the limiting process. Through the limiting process, the Di sequence shows a waveform of which frequency is 5 and amplitude is defined by the threshold value M1.

Consequently, the waveform of the Di sequence is filtered by a digital band pass filter of which main frequency is $2\pi/5$ and DC gain is 0, such that the filtered waveform is shown as a sine wave of which the frequency and the amplitude is modified to some extent. If the frequency of the result waveform is not 5, the result of the filtering shows approximate 0.

Accordingly, a power calculated from the filtered waveform close to the sine wave will be large if the frequency of the waveform is 5, i.e., the film mode, and will be close to 0 if the frequency of the waveform is not 5. The power is prepared with a preset threshold value M2. If the value of the power is greater than the threshold value M2, it is determined that the film signals is in film mode because the periodic pattern of the fields is identified. Otherwise, the signals are not in the film mode.

Figure 2:
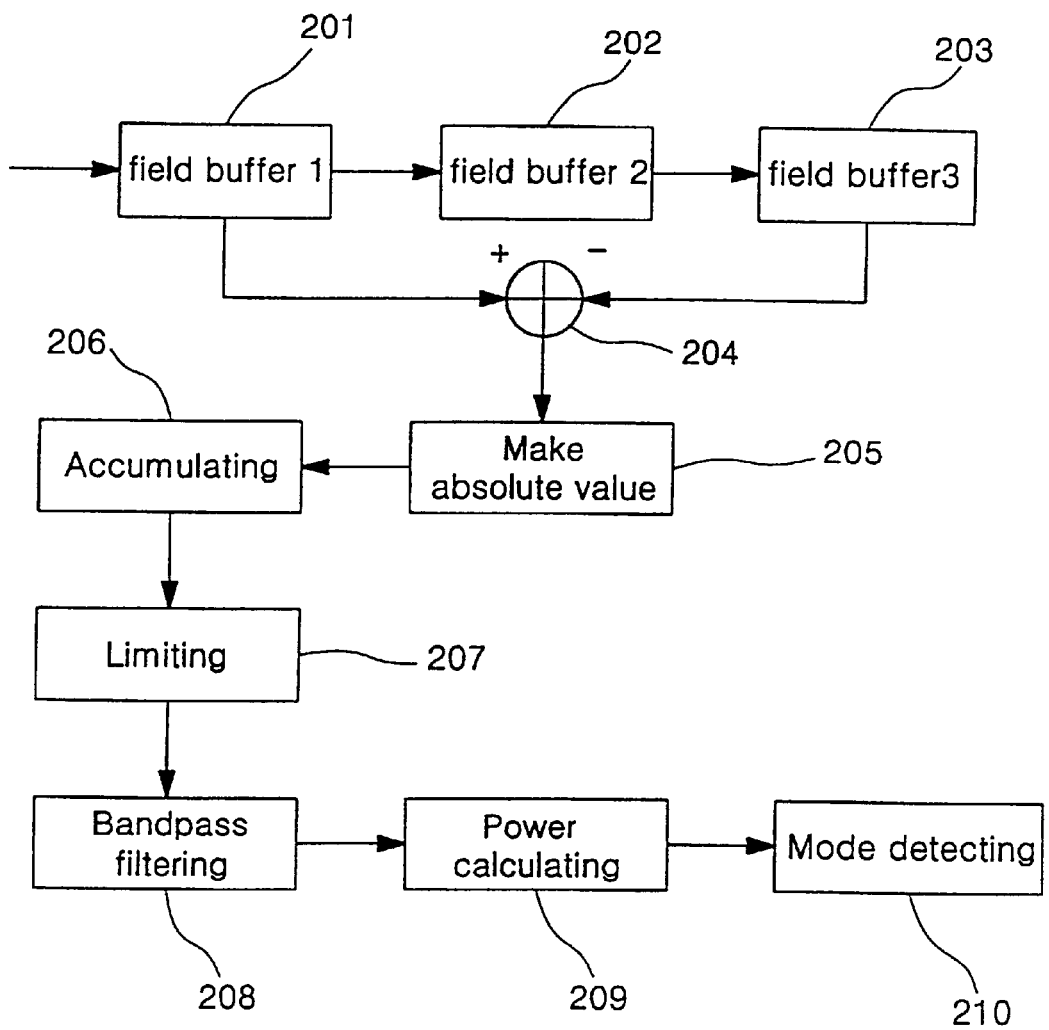
FIG. 2 is a block diagram for explaining a film mode detection method according to the preferred embodiment of the present invention.

FIG. 2 shows the film mode detection method according to the preferred embodiment of the present invention. To temporally store fields, 3 field buffers 201, 202, and 203 are used so that 3 fields in different time delay are sequentially stored at each buffer. The first buffer 201 and the third buffer 203 store two fields arranged within the distance of 1/30 seconds on the time line. The two fields stored in the first and the third buffer 203 are in operation of subtraction at a subtractor 204 such that a difference between corresponding pair of pixels in the two fields. Next, the difference value obtained at the subtractor 204 is sent to an absolute value calculator 205 for obtaining an absolute value of the difference. The absolute value obtained at the absolute value calculator 205 is then accumulated in an accumulator 206 such that the sum of the absolute values is obtained. The sum of the absolute values between the two fields are processed using the threshold value M1 in limiting means 207, and then filtered through a band pass filter 201 such that signal reflecting the Di sequence is obtained. Consequently, a power of the signal reflecting the Di sequence is calculated at a power calculating means 209. Finally, the power obtained at the power calculating means 209 is compared with the threshold value M2 such that the signal where the power is greater than the threshold value M2 is determined as a 3:2 pull-down film mode, and the signal in which the power is less than the threshold value M2 is determined as not a 3:2 pull-down film mode. If the signal is determined as a 3:2 film mode, the signal is transferred to an appropriate TV signal.

According to the present invention, it is possible to clearly recover the original 2 frames of 24 Hz from the transferred 5 fields of 60 Hz if it is determined that the signal is pulled down in 3:2 process. The recovered 2 frames are repeatedly converted into 5 fields and then can be scanned on PC or TV monitors using the progressive scanning for displaying the film. By using this method, problems found in the interlaced scanning can be solved. Also, this method can be used in TV systems adopting analog progressive scanning technologies recently reported.

The television systems adopting the analog progressive scanning of ITU-T 60I standard uses a decoder for outputting 60I format signals and a deinterlacer chip for converting the 60I format of 720 pels×480 pels into the 60P format of 720 pels×480 pels such that if the input signals is determined as film mode signals, the deinterlacing can be a simple process of decoding the 2 fields into one frame. Furthermore, this method allowing the DVD and digital images to be progressively scanned such that the flicker phenomenon caused by the interlaced scanning is prevented at its source.

By the film mode detection method of the present invention, it is possible to convert DVD images or digital TV images into the progressive images on the basis of the film mode information detected in the 3:2 full-down process. Accordingly, the flicker phenomenon caused by the interlaced scanning can be prevented at its source.

What is claimed is:

1. A film mode detection method using a periodic pattern of a video sequence comprising:
   (a) computing every absolute value of differences between every pair of corresponding pixels in two adjacent fields which are arranged within a predetermined distance on a time line;
   (b) getting sum of the differences between every corresponding pixels in two fields; and
   (c) comparing the sum of the absolute value of the differences with a predetermined threshold value; and
   (d) determining whether the video sequence is a film mode based on the result of the comparison, wherein a periodic pattern of a video sequence comprising the sum of the absolute value of the differences between the every corresponding pixels is used for detecting the film mode, and the periodic pattern of the video sequence is detected by the band pass filtering of which main frequency is $2\pi/5$ and DC gain is 0.

2. The film mode detection method as claimed in claim 1, wherein said getting the sum of the differences comprises limiting a maximum value of the sum of the absolute value of the differences.

3. The film mode detection method as claimed in claim 2, wherein the limiting process is performed by comparing the sum of the absolute value of the differences between every corresponding pixels in two fields with the predetermined threshold value and replacing the sum with the threshold value if the sum is greater than the threshold value.

4. The film mode detection method as claimed in claim 1, wherein a power of the band pass filtered signal is calculated and compared to a predetermined threshold value, and the film mode is detected if the calculated power is greater than the threshold value.

5. The film mode detection method as claimed in claim 1, wherein the two adjacent fields which are arranged within a predetermined distance on a time line are every other field of fields in the video sequence.

6. The film mode detection method as claimed in claim 5, wherein the two adjacent fields are separated by $\frac{1}{30}$ seconds on the time line.

7. The film mode detection method as claimed in claim 1, wherein every pair of corresponding pixels are matched pixels in the two adjacent fields.

8. The film mode detection method as claimed in claim 1, wherein the periodic pattern of the video sequence identifies a frequency of repeated fields in the video sequence.

9. A film mode detection method using a periodic pattern of a video sequence comprising:
   (a) computing every absolute value of differences between every pair of corresponding pixels in two periodic fields which are arranged within a predetermined distance on a time line;
   (b) comparing a sum of the absolute value of the differences between every corresponding pixels in two fields with a first predetermined threshold value M1 and limiting the sum to the first threshold value if the sum is greater than the first threshold value;
   (c) filtering a sequence comprising the sum of the absolute value of the differences between every pair of corresponding pixels in two fields and calculating a power of the filtered sum value; and
   (d) comparing the power calculated in the step (c) with a second predetermined threshold value M2 so as to determine the signal as a film mode if the power of the sum value is greater than the second threshold value, wherein a periodic pattern of a video sequence is detected using a band pass filtering, and wherein the period of the video sequence is detected by the band pass filtering of which a main frequency is $2\pi/5$ and DC gain is 0.

10. The film mode detection method as claimed in claim 8, wherein the two periodic fields which are arranged within the predetermined distance on a time line are alternate fields in the video sequence.

11. The film mode detection method as claimed in claim 8, wherein the periodic pattern of the video sequence identifies a frequency of repeated fields in the video sequence.

* * * * *